United States Patent
Gongate et al.

(10) Patent No.: US 11,848,991 B2
(45) Date of Patent: Dec. 19, 2023

(54) SYSTEM AND METHOD FOR VALIDATING DATA ASSOCIATED WITH PARAMETER/S

(71) Applicant: CARRIER CORPORATION, Palm Beach Gardens, FL (US)

(72) Inventors: Suzankumar Gongate, Telangana (IN); Kanna Selvakani, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 131 days.

(21) Appl. No.: 17/252,383

(22) PCT Filed: Jun. 30, 2020

(86) PCT No.: PCT/IB2020/056181
§ 371 (c)(1),
(2) Date: Dec. 15, 2020

(87) PCT Pub. No.: WO2021/019325
PCT Pub. Date: Feb. 4, 2021

(65) Prior Publication Data
US 2022/0182449 A1    Jun. 9, 2022

(30) Foreign Application Priority Data
Jul. 31, 2019 (IN) .............................. 201911030955

(51) Int. Cl.
*H04L 67/12*     (2022.01)
*H04W 4/38*     (2018.01)
(Continued)

(52) U.S. Cl.
CPC ............ *H04L 67/12* (2013.01); *H04L 67/125* (2013.01); *H04W 4/38* (2018.02); *H04W 4/80* (2018.02)

(58) Field of Classification Search
CPC ........ H04L 67/12; H04L 67/125; H04W 4/38; H04W 4/80; H04W 4/70; G01D 3/08
See application file for complete search history.

(56) References Cited

U.S. PATENT DOCUMENTS

2013/0311140 A1* 11/2013 Schechter ............... H04L 67/34
702/188
2015/0308838 A1* 10/2015 Mishra ............... G01C 21/3476
701/519

(Continued)

OTHER PUBLICATIONS

International Search Report for International Application No. PCT/IB2020/056181; Application Filing Date: Jun. 30, 2020; dated Sep. 16, 2020; 3 pages.

(Continued)

*Primary Examiner* — Steven Hieu D Nguyen
(74) *Attorney, Agent, or Firm* — CANTOR COLBURN LLP

(57) ABSTRACT

Aspects of the invention are directed towards a system and a method for validating data associated with parameter/s. One or more embodiments of the invention describe a method comprising steps of receiving a first data associated with a parameter monitored by a first sensing device which is associated with a controller and determining validity of the first data. The method further comprising the steps of receiving a second data from a second sensing device by the controller if the first data is invalid. The method also comprising the steps of connecting with a server if connectivity with the second sensing device is not available and receiving a third data for the second sensing device, wherein the server receives the third data from the second sensing device. And then, the second data or the third data associated with the parameter is validated.

20 Claims, 3 Drawing Sheets

(51) Int. Cl.
*H04W 4/80* (2018.01)
*H04L 67/125* (2022.01)

(56) References Cited

U.S. PATENT DOCUMENTS

2016/0323257 A1* 11/2016 Kang .................... H04W 12/08
2017/0018441 A1  6/2017 Kohlenberg et al.
2017/0184416 A1  6/2017 Kohlenberg et al.

OTHER PUBLICATIONS

Written Opinion for International Application No. PCT/IB2020/056181; Application Filing Date: Jun. 30, 2020; dated Sep. 16, 2020; 6 pages.

* cited by examiner

SYSTEM AND METHOD FOR VALIDATING DATA ASSOCIATED WITH PARAMETER/S

TECHNICAL FIELD OF INVENTION

The present invention relates generally to communications. More particularly, the invention relates to a system and a method for validating data associated with parameter/s and controlling the parameter thereof.

BACKGROUND OF THE INVENTION

Currently, there are various items available in the market which need to be placed in a suitable place/environment. If such items are not placed in a suitable place/environment, then these items get stale or become unusable for end consumer/user. For instance, the place/environment has a level of temperature, humidity or carbon dioxide which are not suitable for the items and thereby, cause harm to the items. Such unfavorable environment makes the item stale or unusable for the end consumer/user.

In order to ensure that the items are placed in a suitable place/environment, one or more sensing devices have been used to monitor parameter/s (such as temperature, humidity or carbon dioxide etc.) therein. One specific example of the sensing devices are a return air sensor and a supply air sensor for a refrigeration control system installed on a storage unit having the items therein. The return air sensor monitors parameter/s for the air entering into the refrigeration control system from the storage unit and the supply air sensor monitors parameter/s for the air supplied out from the refrigeration control system to the storage unit.

One of the critical operations is to maintain the parameters in a system when critical items are transported. The items which need critical care with respect to the environment are transported in different kinds of control units. For example, transport refrigeration units are used to carry items which are required to be maintained in a specific and critical range of temperatures and other parameters such as gases and the like.

In an event, if a return air sensor fail or stops working in a transport refrigeration unit, then the supply air sensor may not be sufficient alone or effective to maintain the parameter/s for the storage unit. Further, when the return air sensor does not function/operate properly, data provided by the return air sensor for monitoring the parameter is incorrect or erroneous. In such a case, there are no alternative means available to receive the correct data associated with the parameter/s inside the storage unit. The parameters which were being monitored by the return air sensor are not effectively controlled in the storage unit and thereby, the items are not placed in the suitable place/environment. This may make the items in the storage unit stale or unusable for the end consumer/user. Furthermore, the only mechanism available to check if the return air sensor is functioning/operating properly, is through manual intervention. In transport refrigeration system, if the vehicle is at a remote location, then it becomes difficult to rectify the problems in controlling the parameters such as temperature. In such a case, a technician needs to visit the remote location to change the defective part such as return air sensor.

In view of the afore-mentioned problems, there is a need of an effective system and a method for placing items in a suitable/favorable environment by adopting alternative means to receive data associated with the parameter/s. There is also a need of a system and a method for automatically determining if return air sensor of a storage unit is functioning/operating properly. There is also a requirement of a system and a method for maintaining parameters at optimal values in the storage unit for avoiding the items to become stale or unusable for the end consumer/user. In order to solve the problems in the existing solutions, a system and a method is disclosed for validating data associated with parameter/s and maintaining the parameters thereof which addresses the afore-mentioned problems.

SUMMARY OF THE INVENTION

Various embodiments of the invention describe a method and a system for validating data associated with parameter/s. The invention discloses a method comprising the steps of receiving a first data associated with a parameter monitored by a first sensing device which is associated with a controller. The method determines validity of the first data by a validation unit. The method further comprises the steps of receiving a second data from a second sensing device by the controller if the first data is invalid. The method also comprises the steps of connecting with a server if connectivity with the second sensing device is not available and receiving a third data for the second sensing device, wherein the server receives the third data from the second sensing device. And then, the second data or the third data associated with the parameter is validated.

In an embodiment of the invention, the validation of the first data, the second data, or the third data is performed by using a predetermined parameter range, wherein the predetermined parameter range corresponds to historical parameter values.

In another embodiment of the invention, the validation is performed to determine proper functioning of the first sensing device.

In a further embodiment of the invention, the first sensing device corresponds to a return air sensor.

In yet another embodiment of the invention, the controller controls the parameter based on the first data, the second data or the third data.

In a different embodiment of the invention, the first data, the second data or the third data have an associated time frame.

In another embodiment of the invention, the first data, the second data or the third data correspond to the parameter associated with a storage equipment.

In a further embodiment of the invention, the controller connects with the server through a long-range communication and/or the controller connects with the second sensing device through a short-range communication.

In yet another embodiment of the invention, the second sensing device transmits the second data associated with the parameter to the server using a long-range communication.

In yet another embodiment of the invention, a controller is disclosed that comprises a processor configured to receive a first data associated with a parameter monitored by a first sensing device, the first sensing device is associated with the controller. The controller further comprises a validation unit configured to determine validity of the first data and a short-range transceiver configured to receive a second data from a second sensing device if the first data is invalid. The controller also comprises a long-range transceiver configured to connect with a server for receiving a third data for the second sensing device if connectivity with the second sensing device is not available, wherein the server receives the third data from the second sensing device. The validation unit is further configured to validate the second data or the third data associated with the parameter.

In an embodiment of the invention, the validation of the first data, the second data, or the third data is performed by using a predetermined parameter range, wherein the predetermined parameter range corresponds to historical parameter values.

In another embodiment of the invention, the validation is performed to determine proper functioning of the first sensing device.

In a further embodiment of the invention, the first sensing device corresponds to a return air sensor.

In yet another embodiment of the invention, the controller is further configured to control the parameter based on the first data, the second data or the third data.

In a different embodiment of the invention, the first data, the second data or the third data have an associated time frame.

In another embodiment of the invention, the first data, the second data or the third data correspond to the parameter associated with a storage equipment.

In yet another embodiment of the invention, the second sensing device transmits the second data associated with the parameter to the server using a long-range communication.

In various other embodiments of the invention, a computer readable medium is disclosed comprising one or more processors and a memory coupled to the one or more processors. The memory stores instructions which are executed by the one or more processors to receive a first data associated with a parameter monitored by a first sensing device which is associated with a controller and determine validity of the first data by a validation unit. The memory also stores instructions which are executed by the one or more processors to receive a second data from a second sensing device by the controller if the first data is invalid. The memory further stores instructions which are executed by the one or more processors to connect with a server if connectivity with the second sensing device is not available and receive a third data for the second sensing device, wherein the server receives the third data from the second sensing device. And then, the second data or the third data associated with the parameter is validated.

In an embodiment of the invention, the validation of the first data, the second data, or the third data is performed by using a predetermined parameter range, wherein the predetermined parameter range corresponds to historical parameter values.

In another embodiment of the invention, the first data, the second data or the third data haves an associated time frame.

This summary is provided to introduce a selection of concepts in a simplified form from that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
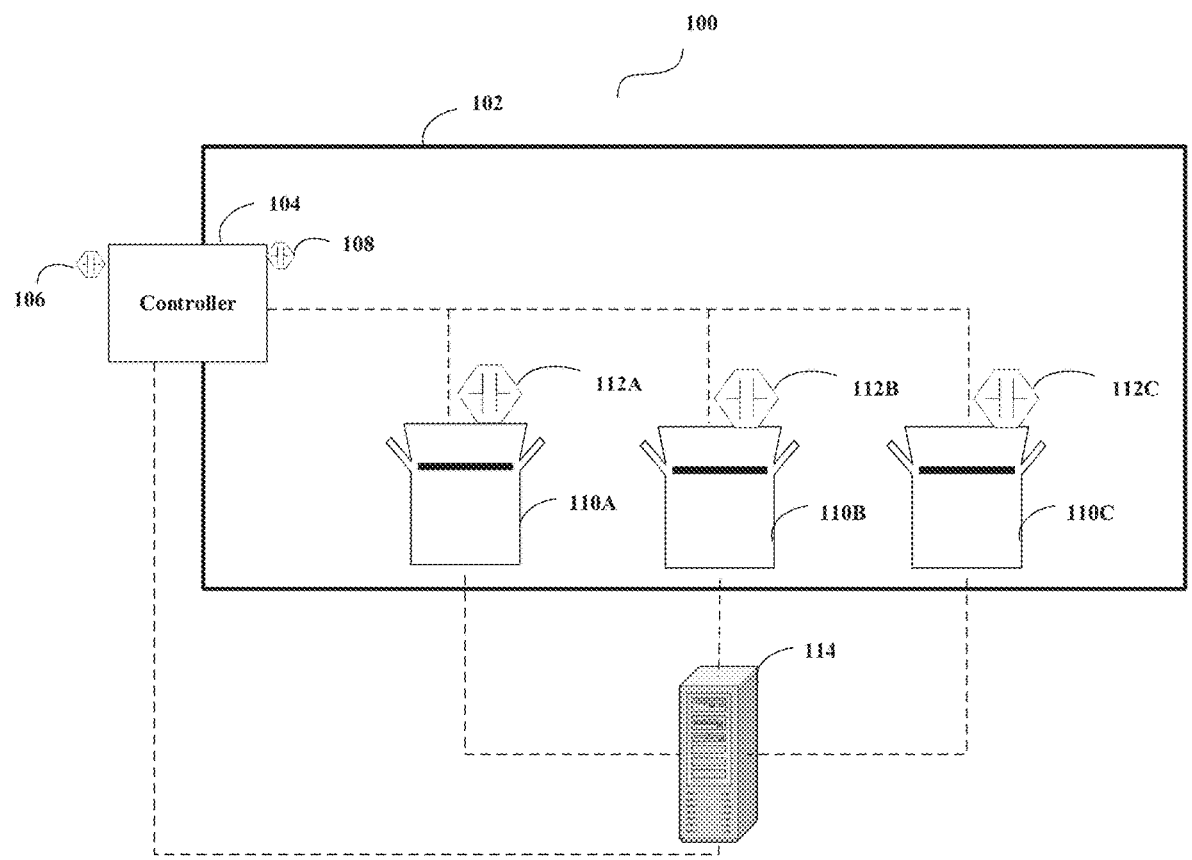
FIG. 1 depicts an exemplary architecture for validating data associated with parameter/s, according to an exemplary embodiment of the invention.

Described herein is the technology for a system and a method for validating data associated with parameter/s and controlling the parameters therein. The technology can be used to control the parameters for industrial control as well as other areas which are sensitive to parameters such as temperatures, pressures, gases such as $CO_2$. The parameters can further be controlled in transport vehicles which carry parameter sensitive materials and items. The parameter/s are monitored by a first sensing device and a second sensing device. Also, the first sensing device is associated with a controller.

As used herein, the first sensing device may be a sensor that possess capability of sensing/monitoring one or more parameters for example, the air entering into a refrigeration control system from a storage unit. The first sensing device may also have the capability to communicate with a controller. The first sensing device may transmit data associated with the parameter/s to the controller. In an exemplary embodiment, the first sensing device may be a return air sensor associated with the controller and installed into the refrigeration control system of the storage unit.

As used herein, the second sensing device may be a sensor that possesses capability of sensing/monitoring one or more parameters of the air outside the items placed in the storage unit. The second sensing device may also have the capability of communicating with the controller and/or a server. The second sensing device may communicate with the controller through a short-range communication and may communicate with the server through a long range communication such as, cellular communication. The first sensing device and/or the second sensing device may be a temperature sensor, a gas sensor, a smoke sensor, a humidity sensor, fire sensor, air quality sensor, occupancy detector or any such sensor that is obvious to a person skilled in the art. Moreover, the first sensing device and/or the second sensing device may have a long-range module, a short-range module, a processor, and a memory.

As used herein, the controller may refer to any device that is capable of remotely controlling the parameter/s inside the storage unit. Further, the controller may receive data associated with the parameters from the first sensing device, the second sensing device, and/or the server. Further, the controller may communicate with the second sensing device through a short-range communication and may communicate with the server through a long-range communication. Moreover, in an embodiment, such controller may be associated with a storage unit, a smart storage unit, a thermostat, an air conditioner unit, refrigeration unit or any such unit that is known in the art.

As used herein, the server may have processing capabilities and may also communicate with the controller and the second sensing device through the long-range communication. Moreover, the server may have a long-range module, a processor, and a memory. The server may also be associated with a cloud storage, a remote database, or any such storage known in the art.

As used herein, the parameter/s which are monitored by the first sensing device and the second sensing devices may include, but not limited to, temperature, smoke, gas, carbon-dioxide gas, humidity, or any such parameter that is known in the art.

As used herein, the long-range communication may refer to a cellular communication established through a Global System for Mobile (GSM) network, Long-Term Evolution (LTE) network, a code-division multiple access (CDMA) network, a narrow-band internet of thing (NB-IoT) technique or category M1 technique or any such network/technique that is known in the art.

As used herein, the short-range communication may refer to a communication established through a WiFi access point, a bluetooth network, a near-field network, or a ZigBee network.

Throughout the specification, reference numeral 110 can be considered as one or more items. The reference numerals 110A, 110B, 110C . . . 110N can be considered as a single item. Likewise, reference numeral 112 can be considered as one or more second sensing devices. The reference numerals 112A, 112B, 112C . . . 112N can be considered as a single second sensing device.

FIG. 1 depicts an exemplary architecture 100 for validating data associated with parameter/s, according to an exemplary embodiment of the invention. The exemplary architecture 100 comprises a storage unit 102, a controller 104 associated with the storage unit 102, a first sensing device 106 and/or a third sensing device 108 associated with the controller 104, an item 110 and a second sensing device 112 associated with the item 110, and a server 114 connected with the controller 104 and/or the second sensing device 112. In an exemplary embodiment, the third sensing device 108 associated with the controller 104 is a supply air sensor.

As depicted herein, the item(s) 110 may be placed in the storage unit 102 and the second sensing device 112 may be positioned or located anywhere outside the item 110. As discussed above, the first sensing device 106 may monitor parameter associated with the air entering into a refrigeration system from the storage unit 102 and the second sensing device 112 may monitor parameter/s of the air outside the items 110 placed inside the storage unit 102. Also, the first sensing device 106 may transmit a first data associated with the parameter to the controller 104. In an exemplary embodiment, the first sensing device may be a return air sensor. Further, the controller 104 may receive the first data associated with the parameter monitored by the first sensing device 106. Then, the controller 104 may determine validity of the first data associated with the parameter. The validity of the first data associated with the parameter may be performed by using a predetermined parameter range, wherein the predetermined parameter range corresponds to historical parameter values. Specifically, the first data may be compared with the predetermined parameter range. Such predetermined parameter range may be pre-defined by manufacturer of the item 110 or may be parameter values based on a history of parameter values associated with the item(s) 110. These historical parameter values may be the parameter values which are observed by the controller 104 over a period of time (may be for a month, specific dates etc.). The controller 104 may determine the first data associated with the parameter as a valid data or an invalid data. The first data may be valid when the first data may fall within the predetermined parameter range or historical parameter values. Also, the first data may be invalid when the first data may not fall within the predetermined parameter range or historical parameter values.

When the controller 104 determines that the first data is invalid, the controller 104 may connect with the second sensing device 112 to receive a second data from the second sensing device 112. The controller 104 may connected with the second sensing device 112 through a short-range communication. If the controller 104 gets connected with the second sensing device 112 through a short-range communication, the controller 104 may request a second data associated with the parameter and in turn, the second sensing device 112 may transmit the second data to the controller 104. In addition, the second sensing device 112 may transmit the second data associated with the parameter to the server 114 through a long-range communication, where the server 114 stores the second data associated with the parameter received from the second sensing device 112 as a third data associated with the parameter.

Once the controller 104 receives the second data associated with the parameter from the second sensing device 112, the controller 104 may validate the second data associated with the parameter. The validity of the second data associated with the parameter may be performed in the same manner as the validity of the first data is performed. Accordingly, the controller 104 may determine the second data associated with the parameter as valid data or an invalid data as described above. In an event when the controller determines the second data associated with the parameter as valid data, the controller may use the second data associated with the parameter and accordingly, the controller 104 may control the parameter inside the storage unit 102.

And, when the controller 104 does not connect or fails to get connected with the second sensing device 112 through the short-range communication, the controller 104 may establish connection and connect with the server 114 through the long-range communication. Then, the controller 104 may request to the server 114 for transmitting the third data associated with the parameter. Subsequently, the server 114 may transmit the third data associated with the parameter. Then, the controller 104 may receive the third data associated with the parameter.

Once the controller 104 receives the third data associated with the parameter from the server 114, the controller 104 may validate the third data associated with the parameter. The validity of the third data associated with the parameter may be performed in the same manner as the validity of the first data is performed. Accordingly, the controller 104 may determine the third data associated with the parameter as a valid data or an invalid data as described above. In an event when the controller determines the third data associated with the parameter as valid data, the controller may use the third data associated with the parameter and accordingly, the controller 104 may control the parameter inside the storage unit 102. It is to be noted here that the controller 104 uses the third data associated with the parameter from the server 114 when the controller 104 and the second sensing device 112 fail to get connected with the each other through the short-range communication. Alternatively, the controller 104 uses the second data associated with the parameter from the second sensing device 112 when the controller 104 and the second sensing device 112 get connected with the each other through the short-range communication.

Thus, the controller 104 has alternative means to collect the desired data related to the parameter even if there is any malfunctioning by one of the sensing devices 106/112. It is be noted here that in case the first sensing device 106 does not work or fails, then, in such a case, there would be no data and as such would be assumed to be null. The null data would again be compared with the predetermined parameter range and accordingly, the controller 104 would check for locally available data from the second sensing device 112.

The present invention also facilitates the controller 104 to use time-stamp associated with the first data, the second data and/or the third data for further validating the first data, the second data and/or the third data associated with the parameter/s. For an instance, consider the time-stamp associated with the first data as 09:10 AM and the time-stamp associated with the second data as 09:15 AM. In this situation, the controller 104 may analyze that each of the associated time stamp of the first data and the second data are close to reach other (i.e. with the gap of 5 minutes) and thus, controller 104 may utilize such time-stamp to further validate the first data and the second data. In other exemplary situation, the consider the time-stamp associated with the first data as 09:10 AM and the time-stamp associated with the third data as 10:18 AM. In this situation, the controller 104 may analyze that the associated time stamp of the first data and/or the third data are distant to each other (i.e. with the gap of 1 hours and 8 minutes) and thus, controller 104 may not utilize such associated time-stamp to further validate the first data and/or the third data.

In an embodiment of the present invention, the first data, the second data and/or the third data associated with the parameter/s reported by the first sensing device 106, the second sensing device 112 and the server 114, respectively may be approximately equal/same with closely associated time-stamps and/or within the predetermined parameter range. In this scenario, the controller 104 may determine that the first sensing device 106 is functioning properly. In an alternative embodiment of the present invention, the first data, the second data and/or the third data associated with the parameter/s reported by the first sensing device 106, the second sensing device 112 and the server 114, respectively may not be equal/same having distant associated time-stamps and/or falls outside the predetermined parameter range. In this scenario, the controller 104 may determine that the first sensing device 106 is not functioning properly. Although the present invention has been explained herein to determine if the first sensing device 106 is functioning properly or not; however; it is well-understood for a person skilled in the art that the present invention would also work or function in the same manner to determine if the third sensing device 108 is functioning properly or not.

The present invention encompasses the validation of the first data, the second data and/or the third data associated with the parameter/s to determine if the first sensing device 106 is functioning properly or not. In case the first sensing device 106 is not functioning properly, the controller 104 may utilize/consider the second data and/or the third data associated with the parameter/s and accordingly, the controller 104 may control the parameter/s inside the storage unit 102 based on the second data and/or the third data. In another case, when the first sensing device 106 is functioning properly, the controller 104 may utilize/consider the first data associated with the parameter/s and accordingly, the controller 104 may control the parameter/s inside the storage unit 102 based on the first data.

Considering an example where the first sensing device 106 and the second sensing device 112 measure a temperature parameter for the storage unit 102. The first sensing device 106 measure 28.5° C. (i.e. first data) associated with the temperature parameter at 10:20 pm. Now, the controller 104 may determine validity of the first data by comparing this data with predetermined parameter range (for e.g. say 22° C.-28° C.). In this scenario, the controller 104 may find this first data as invalid data as the first data does not fall within or fall outside the predetermined parameter range. Alternatively, if the first sensing device 106 measure 27° C. (i.e. first data) associated with the temperature parameter at 10:20 pm. Then, the controller 104 may determine this first data as valid data as the first data falls within the predetermined parameter range.

Further, the second sensing device 112 may measure 23° C. (i.e. second data) associated with the temperature parameter at 10:20 pm. Then, the controller 104 may check if a connection with the second sensing device 112 can be established. If the connection with second sensing device 112 can be established, then the controller may receive 23° C. (i.e. second data) associated with the temperature parameter. The controller 104 may further determine validity of the second data by comparing this data with predetermined parameter range (for e.g. say 22° C.-28° C.). In this scenario, the controller 104 may find the second data as a valid data since the second data falls within the predetermined parameter range. Also, the controller 104 may check and compare the associated time-stamps with the first data (10:20 pm) and the second data (10:20 pm) which are close to each other. In this case, the controller 104 may find the second data as valid data over the first data and may consider the second data to control the temperature parameter for the storage unit.

When the controller 104 is unable to connect with the second sensing device 112, the controller may connect with the server 114. Also, the sensing device 112 further transmits 23° C. (i.e. second data) to the server 114, where the server 114 stores 23° C. as third data at 10:22 pm.). Then, the controller 104 may determine validity of the third data (23° C.) by comparing this data with predetermined parameter range (for e.g. say 22° C.-28° C.). In this scenario, the controller 104 may find this third data as a valid data as the third data falls within the predetermined parameter range. Also, the controller 104 may check and compare the associated time-stamps with the first data (10:20 pm) and third data (10:22 pm) which are close to each other. In this case, the controller 104 may find the third data valid over the first data and may consider the third data to control the temperature parameter for the storage unit.

Figure 2:
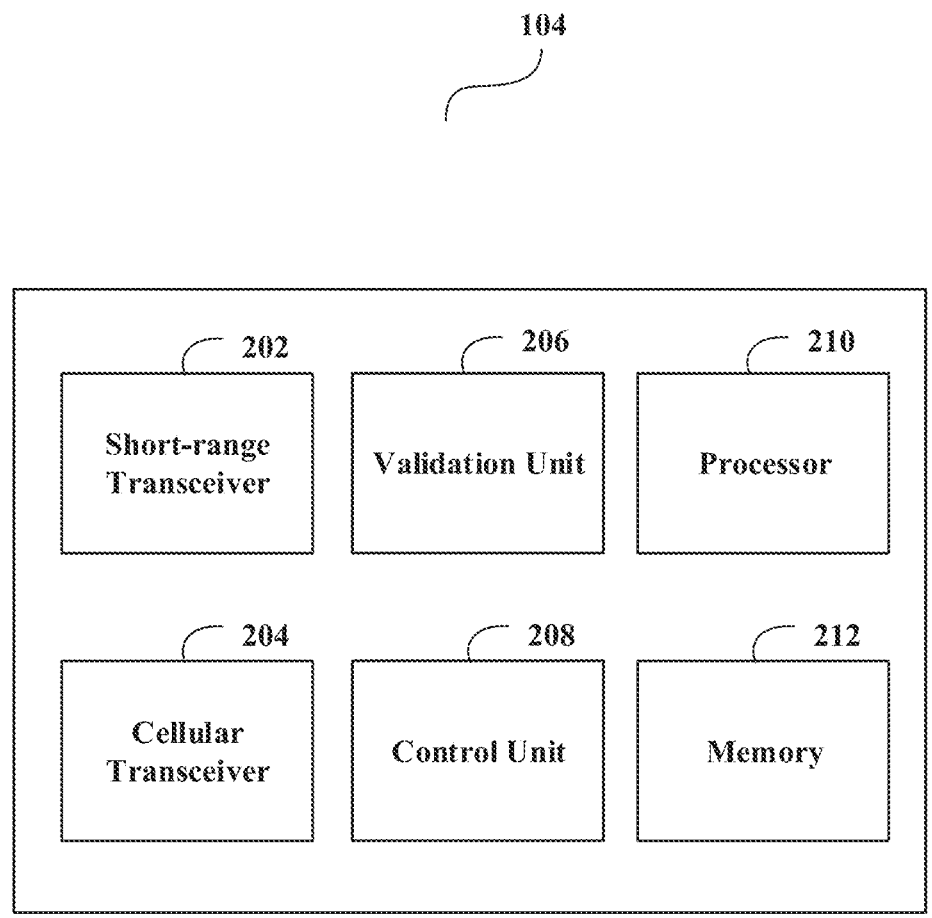
FIG. 2 depicts block diagram of different components in a controller according to an exemplary embodiment of the invention.

FIG. 2 depicts block diagram of different components of a controller 104 according to an exemplary embodiment of the invention. The controller 104 comprises a short-range transceiver 202, a long-range transceiver 204, a validation unit 206, a control unit 208, a processor 210 and a memory 212. As described in FIG. 1 above, the short-range transceiver 202 of the controller 104 may be configured to establish a short-range communication with the second sensing device 112. The short-range transceiver 202 of the controller 104 may also be configured to receive the second data associated with the parameter from second sensing device 112 if the first data is invalid and if the controller 104 is able to connect with the second sensing device 112. The long-range transceiver 204 of the controller 104 may be configured to establish a long-range communication with server 114. The long-range transceiver 204 of the controller 104 may also be configured to receive the third data associated with the parameter for the second sensing device 106 if the controller 104 is unable to connect with the second sensing device 112. Further, the processor 210, the long-range transceiver 204 and/or the short-range transceiver 202 of the controller 104 may also be configured to receive the first data associated with the parameter monitored by the first sensing device 106. The first sensing device 106 is associated with the controller 104. Moreover, the validation unit 206 of the controller 104 may be configured to determine validity of the first data associated with the parameter. The validity of the first data associated with the parameter may be performed by using a predetermined parameter range, wherein the predetermined parameter range corresponds to historical parameter values. In addition, the validation unit 206 of the controller 104 may also be configured to validate the second data or the third data associated with the parameter as discussed above. The control unit 208 of the controller 104 may be configured to control the parameter inside the storage unit 102 based on the first data, the second data and/or the third data. The memory 212 of the controller 104 may be configured to store the first data from the first sensing device 106, the second data from the second sensing device 112 and/or the third data from the server 114. The memory 212 of the controller 104 may also be configured to store the predetermined parameter range, wherein the predetermined parameter range corresponds to historical parameter values. Further, the short-range transceiver 202, the long-range transceiver 204, the validation unit 206, the control unit 208, and/or the memory 212 may be communicably coupled with the processor 210.

Figure 3:
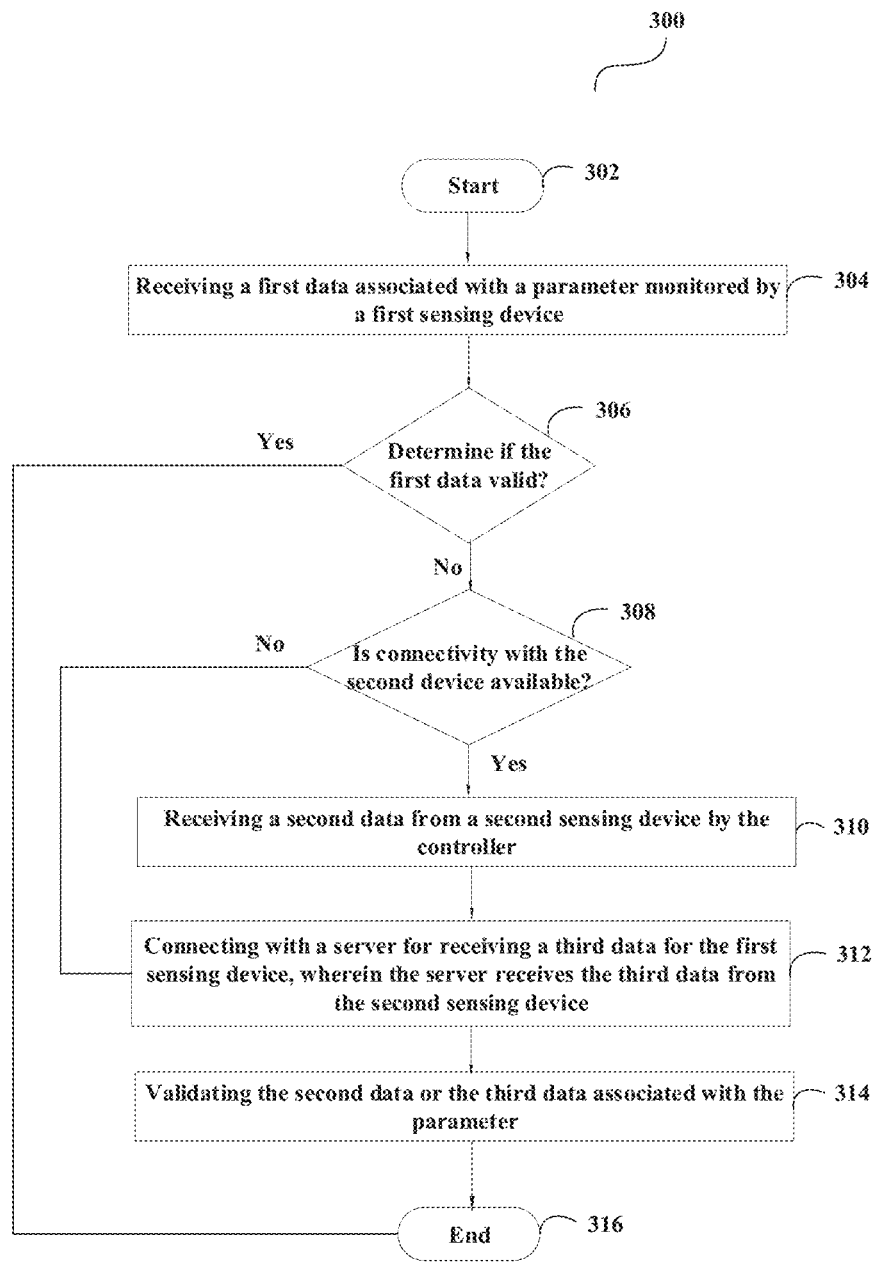
FIG. 3 depicts an exemplary flowchart illustrating a method to perform the invention according to an exemplary embodiment of the invention.

FIG. 3 depicts an exemplary flowchart illustrating a method being performed according to an exemplary embodiment of the invention. The method flowchart 300 describes a method being performed for enabling the invention. The method flowchart 300 starts at step 302.

At step 304, the controller 104 may receive the first data associated with the parameter monitored by the first sensing device 106. The first sensing device 106 is associated with the controller 104.

At step 306, the controller may determine validity of the first data associated with the parameter using the validation unit 206 after the controller 14 receives the first data associated with the parameter from the first sensing device 106. In case the controller 104 determines the first data as a valid data, the method 300 may end at step 316. Alternatively, the controller 104 may determine the first data as an invalid data, then in such situation, the method 300 may end at step 308.

At step 308, when the controller 104 determine that the first data is invalid using the validation unit 206, the controller may determine if a connection with the second sensing device 112 can be established. In case the controller 104 is able to establish a connection with the second sensing device 112 through a short-range communication, then the method 300 may move to step 310. Otherwise, the method 300 may move to step 312 if the controller 104 is unable to establish a connection with the second sensing device 112.

At step 310, the controller may receive the second data associated with the parameter from the second sensing device 112 if the controller 104 is able to establish a connection with the second sensing device 112 through a short-range communication.

At step 312, if the controller 104 is unable to establish a connection with the second sensing device 112, the controller may establish a connection the server 114 through a long-range communication. Then, the controller 104 may receive the third data associated with the parameter from the server 114. In particular, the server 114 may receive the second data from the second sensing device 112 through the long-range communication and then, the server 114 may store the second data associated with the parameter as the third data associated with the parameter.

At step 314, the controller may validate the second data and/or the third data associated with the parameter as explained above. The method 300 may end at step 316.

The present invention is applicable in various industry/fields such as, but not limited to, heating, ventilation, and air conditioning (HVAC) industry, storage systems, transportation industry, pharmaceutical industry, cosmetics industry, smart metering systems, connected personal appliances, connected industrial appliances (like welding machine, air compressors), healthcare industry, and any such industry/field that is obvious to a person skilled in the art.

The present invention provides the following technical advantages over the existing solutions in the market: a) offers alternative ways to collect data associated with the parameter, b) accurate and consistent control of parameters inside the storage unit even when the first sensing device does not function properly or gets failed, c) uninterrupted, consistent and periodic determination of proper functioning of the first sensing device, d) validate data monitored by the first sensing device by using data from the other sensing devices, and e) does not require any extra cost for implementing the present invention.

The embodiments of the invention discussed herein are exemplary and various modification and alterations to a known person skilled in the art are within the scope of the invention.

In one embodiment of the invention, the invention can be operated using the one or more computer readable devices comprising a computer readable medium. The computer readable medium of the computer readable devices is configured to receive a first data associated with a parameter monitored by a first sensing device 106, the first sensing device 106 is associated with a controller 104 and determine validity of the first data by a validation unit 206. The computer readable medium of the computer readable devices is further configured to receive a second data from a second sensing device 112 by the controller 104 if the first data is invalid. The computer readable medium of the computer readable devices is also configured to connect with a server 114 for receiving a third data for the second sensing device 106 if connectivity with the second sensing device 112 is not available, wherein the server 114 receives the third data from the second sensing device 112. The computer readable medium of the computer readable devices is configured to validate the second data or the third data associated with the parameter.

As discussed above, the validation of the first data, the second data, or the third data is performed by using a predetermined parameter range, wherein the predetermined parameter range corresponds to historical parameter values. The first data, the second data or the third data has an associated time frame as described in detail above.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims. Various embodiments of the invention described herein can be combined and are intended to be within the scope of the claims.

We claim:

1. A method comprising:
   receiving a first data associated with a parameter monitored by a first sensing device, the first sensing device associated with a controller;
   determining validity of the first data by a validation unit;
   if the first data is invalid:
   receiving a second data from a second sensing device by the controller;
   if connectivity with the second sensing device is not available:
   connecting with a server for receiving a third data for the second sensing device, wherein the server receives the third data from the second sensing device; and
   validating the second data or the third data associated with the parameter.

2. The method of claim 1, wherein the validation of the first data, the second data, or the third data is performed by using a predetermined parameter range, wherein the predetermined parameter range corresponds to historical parameter values.

3. The method of claim 1, wherein the validation is performed to determine proper functioning of the first sensing device.

4. The method of claim 1, wherein the first sensing device corresponds to a return air sensor.

5. The method of claim 1, wherein the controller controls the parameter based on the first data, the second data or the third data.

6. The method of claim 1, wherein the first data, the second data or the third data have an associated time frame.

7. The method of claim 1, wherein the first data, the second data or the third data correspond to the parameter associated with a storage equipment.

8. The method of claim 1, wherein the controller connects with the server through a long range communication and/or the controller connects with the second sensing device through a short-range communication.

9. The method of claim 1, wherein the second sensing device transmits the second data associated with the parameter to the server using a long-range communication.

10. A controller comprising:
    a processor configured to receive a first data associated with a parameter monitored by a first sensing device, the first sensing device associated with the controller;
    a validation unit configured to determine validity of the first data;
    a short-range transceiver configured to receive a second data from a second sensing device if the first data is invalid:
    a long-range transceiver configured to connect with a server for receiving a third data for the second sensing device if connectivity with the second sensing device is not available, wherein the server receives the third data from the second sensing device; and
    the validation unit further configured to validate the second data or the third data associated with the parameter.

11. The controller of claim 10, wherein the validation of the first data, the second data, or the third data is performed by using a predetermined parameter range, wherein the predetermined parameter range corresponds to historical parameter values.

12. The controller of claim 10, wherein the validation is performed to determine proper functioning of the first sensing device.

13. The controller of claim 10, wherein the first sensing device corresponds to a return air sensor.

14. The controller of claim 10, wherein the controller is further configured to control the parameter based on the first data, the second data or the third data.

15. The controller of claim 10, wherein the first data, the second data or the third data have an associated time frame.

16. The controller of claim 10, wherein the first data, the second data or the third data correspond to the parameter associated with a storage equipment.

17. The controller of claim 10, wherein the second sensing device transmits the second data associated with the parameter to the server using a long-range communication.

18. A non-transitory computer readable medium comprising a memory storing instructions which are executed by one or more processors, the one or more processors configured to:
   receive a first data associated with a parameter monitored by a first sensing device, the first sensing device associated with a controller;
   determine validity of the first data by a validation unit;
   if the first data is invalid:
   receive a second data from a second sensing device by the controller;
   if connectivity with the second sensing device is not available:
   connect with a server for receiving a third data for the second sensing device, wherein the server receives the third data from the second sensing device; and
   validate the second data or the third data associated with the parameter.

19. The non-transitory computer readable medium of claim 18, wherein the validation of the first data, the second data, or the third data is performed by using a predetermined parameter range, wherein the predetermined parameter range corresponds to historical parameter values.

20. The non-transitory computer readable medium of claim 18, wherein the first data, the second data or the third data have an associated time frame.

\* \* \* \* \*